United States Patent
Walden et al.

(10) Patent No.: US 7,966,929 B2
(45) Date of Patent: Jun. 28, 2011

(54) CAN PROCESSING

(75) Inventors: Richard Walden, Faringdon (GB);
Robin Julian Ferguson, Faringdon (GB)

(73) Assignee: Zinetec Ltd., Norwich (GB)

( * ) Notice: Subject to any disclaimer, the term of this patent is extended or adjusted under 35 U.S.C. 154(b) by 1262 days.

(21) Appl. No.: 10/590,614

(22) PCT Filed: Feb. 28, 2005

(86) PCT No.: PCT/GB2005/000761
§ 371 (c)(1),
(2), (4) Date: Sep. 26, 2006

(87) PCT Pub. No.: WO2005/082173
PCT Pub. Date: Sep. 9, 2005

(65) Prior Publication Data
US 2007/0292570 A1    Dec. 20, 2007

(30) Foreign Application Priority Data
Feb. 26, 2004  (GB) ................................. 0404299.0

(51) Int. Cl.
*A47J 27/18*  (2006.01)
*A23L 3/00*  (2006.01)

(52) U.S. Cl. ................................ 99/371; 99/359; 99/470

(58) Field of Classification Search .................... 99/371, 99/359, 470; 165/48.1, 61; 366/175.3, 212
See application file for complete search history.

(56) References Cited

U.S. PATENT DOCUMENTS

| | | | | |
|---|---|---|---|---|
| 934,858 | A | * | 9/1909 | Trescott .......................... 126/369 |
| 1,010,805 | A | * | 12/1911 | Rogers .............................. 99/369 |
| 1,011,792 | A | * | 12/1911 | Campbell ......................... 99/371 |
| 2,278,434 | A | | 4/1942 | Fahey |
| 3,020,825 | A | | 2/1962 | Schmidt |
| 3,088,180 | A | * | 5/1963 | Lauterbach ...................... 422/25 |
| 3,818,818 | A | * | 6/1974 | Hice, Sr. ........................... 99/330 |
| 3,897,818 | A | | 8/1975 | Champel |

FOREIGN PATENT DOCUMENTS

| | | |
|---|---|---|
| EP | 1 304 433 | 2/2003 |
| GB | 291585 | 6/1928 |
| GB | 481584 | 4/1938 |
| JP | 60153783 | 8/1985 |
| JP | 03-151862 | 6/1991 |
| JP | 7135940 | 5/1995 |
| JP | 7143868 | 5/1995 |
| JP | 10015038 | 1/1998 |
| JP | 10165153 | 6/1998 |
| WO | WO 96/11592 | 4/2006 |

* cited by examiner

*Primary Examiner* — Reginald L Alexander
(74) *Attorney, Agent, or Firm* — Davis & Bujold, P.L.L.C.

(57) ABSTRACT

An apparatus for heat-treating products, has a retort into which the products to be treated are receivable a heating unit for heating the retort; coolant spray for spraying a liquid coolant onto products received in the retort; and a shield to substantially prevent coolant sprayed from the coolant spray from impinging on the interior of the retort. A method of protecting a retort has a retort wall defining a volume into which products to be treated are receivable, a heating unit for heating the retort, and coolant spray for spraying a liquid coolant onto products received in the retort against thermal shock, the method including a mounting shielding apparatus within the retort to substantially prevent liquid coolant sprayed from the coolant spray within the retort from impinging on the interior of the retort wall.

11 Claims, 2 Drawing Sheets

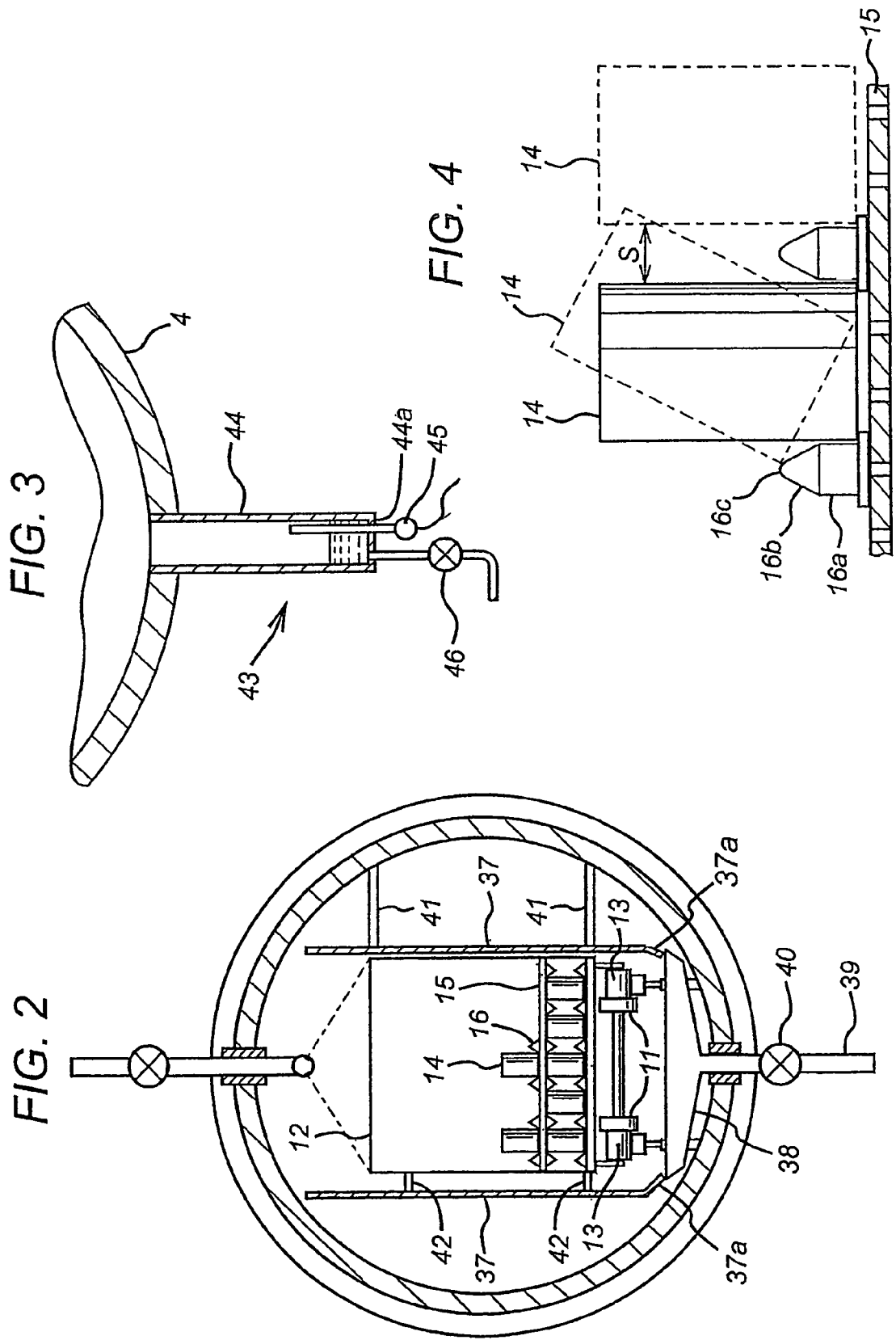

CAN PROCESSING

TECHNICAL FIELD

The invention relates to apparatus for the heat-treatment of containers of predominantly liquid substances, for example of foodstuffs, in a pressure vessel.

BACKGROUND ART

In a normal canning process a liquid or semi-liquid food product optionally containing solids, such as a soup, a cooking sauce, etc. is filled into empty cans through an open end to an appropriate level, leaving a headspace above the product, and the open end of the can is then hermetically sealed with an end closure. The cans and their contents are then sterilised by heating, the heating medium used being usually either steam or hot water at a temperature of typically between 115° C. and 130° C. To achieve this temperature the steam or hot water has to be held at a super-atmospheric pressure, and accordingly the cans and the heating medium are contained in a pressure vessel known as a retort or cooker.

The cans, after filling and closing, are placed in the retort, the retort is closed, and steam or water is introduced. Temperature controllers are usually present on the retort to maintain the heating medium at the desired temperature. While the cans are in the retort, heat from the heating medium is conducted through the container walls and thence passes into the product.

All parts of the food product in the can have to reach and hold sufficient temperature for a sufficient time to achieve so-called "commercial sterility". A large number of products rely mainly on conduction rather than convection to distribute the heat through the can. Typically cans of 73 mm diameter by 110 mm long have to be held for a process time of 80-90 minutes at 121° C. Once sterilised the can must then be cooled, usually with cold water, to a temperature of about 40° C. before being removed from the retort with the cooling and removal procedure taking around 60 minutes.

The total cycle time for placing the un-sterilised cans in the retort to removing them after sterilisation and cooling can be as long as three hours in conventional retorts. This leads to a maximum throughput of just two or three batches of cans for a given retort each working shift. In other words, the retort undergoes only two or three thermal cycles during each working shift.

The long heating times indicated above can lead to overcooking of the food product especially where it lies adjacent to the container wall. In commercial practice it is already well known to reduce the heating time of food products in a static retort by agitating the can by rotating it whilst in the retort. The rotation of the can has been affected either by rotating the can about its cylindrical axis, or by tumbling the can "end-over-end" about a transverse (diametric) axis through its centre.

The first form of agitation can be generated by rolling cans of circular section about their longitudinal axis and is widely used in "Reel and Spiral" cookers. This method of agitation does not induce very efficient mixing of the can's contents, and results in process times being reduced to about 50% as compared to heating without agitation. "End-over-end" tumbling rotation induces better mixing and process time reduction to about 35%, as compared to heating without agitation, can be expected.

In PCT patent application WO 96/11592 there is described a method in which cylindrical cans are held with their axes horizontal, and are moved with a horizontal axial reciprocating motion during the heating and cooling stages, inducing peak accelerations of 1 g or greater (g being the acceleration due to gravity). This process enables canned foodstuffs to be sterilised in typically tenths of the time taken using conventional heating methods, and thus a retort operated using this process may experience tens of thermal cycles per day rather than just the customary two or three.

Conventional retorts for heating cans are designed for a lifetime of tens of years, on the basis of thermal cycle times of three or more hours. If the methods of WO 96/11592 are used, then thermal cycle times are reduced to typically under one hour or possibly to less than 30 minutes and even down to 15 minutes.

The necessarily rapid changes in temperature to achieve these short cycle times increase the thermal stress loadings on the retort. Such repeated thermal loading of the retort can considerably shorten its service life, principally due to the high thermal shock experienced when cooling water is sprayed onto the cans to cool them. Such spray water can splash or otherwise be redirected onto the interior surface of the retort, causing sudden local cooling which generates internal stresses in the retort wall. These stresses can, after a relatively small number of repetitions, lead to the development of cracks, and even to structural failure of the retort.

DISCLOSURE OF INVENTION

According to a first aspect of the present invention there is provided apparatus for heat-treating products, comprising:
 a retort into which the products to be treated are receivable;
 heating means for heating the retort;
 coolant spray means for spraying a liquid coolant onto products received in the retort; and
 shielding means to substantially prevent coolant sprayed from the coolant spray means from impinging on the interior of the retort.

According to a first preferred version of the first aspect of the present invention the shielding means comprises one or more plates of solid metal or plastics sheet material.

According to a second preferred version of the first aspect of the present invention the plates of the shielding means comprises foam or mesh material having a pore or mesh size effective to prevent droplets or streams of coolant from impinging on the retort wall.

According to a third preferred version of the first aspect of the present invention or of any preceding preferred version thereof the shielding means comprises an impervious layer of thermally insulating material.

According to a fourth preferred version of the first aspect of the present invention or of any preceding preferred version thereof the shielding means includes a sump tray mounted at a lower region of the retort and a drain conduit extending from the tray through the retort wall to drain liquid from the tray, and a plurality of vertically extending plates positioned with their lowermost edges above the sump tray so that liquid impinging on the plates will be collected in the sump tray.

According to a fifth preferred version of the first aspect of the present invention or of any preceding preferred version thereof the retort further comprises agitating means for applying a reciprocating motion to products received in the retort.

According to a sixth preferred version of the first aspect of the present invention or of any preceding preferred version thereof the shielding means is fixed relative to the retort.

According to a seventh preferred version of the first aspect of the present invention or of any preceding preferred version thereof there is provided a carrier for supporting products for processing within, and movable relative to, the retort, and at least one of the plates of the shielding means is mounted on the carrier.

According to an eighth preferred version of the first aspect of the present invention or of any preceding preferred version thereof the retort is further provided with trap means at a lower part of the retort adapted to catch coolant liquid impinging on the retort wall due to failure of the shielding means, and a selectively openable drain valve in communication with the trap and openable to drain liquid from the trap.

Typically the trap means incorporates a sensor for detecting the presence of liquid in the trap means such as a level sensor or a sensor adapted to detect a constituent of a liquid coolant composition.

According to a second aspect of the present invention shielding apparatus for a retort comprises a retort wall defining a volume into which products to be treated are receivable, heating means for heating the retort, and coolant spray means for spraying a liquid coolant onto products received in the retort, and shielding means mountable within the retort to substantially prevent liquid coolant sprayed from the coolant spray means from impinging on the interior of the retort wall.

According to a first preferred version of the second aspect of the present invention the shielding means comprises one or more plates of solid sheet material.

According to a second preferred version of the second aspect of the present invention the shielding means comprise foam or mesh material having a pore or mesh size effective to prevent droplets or streams of coolant from impinging on the retort wall.

According to a third preferred version of the second aspect of the present invention the shielding means comprises an impervious layer of thermally insulating material.

According to a fourth preferred version of the second aspect of the present invention or of any preceding preferred version thereof the shielding means includes a sump tray mounted at a lower region of the retort and having a drain conduit extendable through the retort wall to drain liquid from the tray, and a plurality of vertically extending plates positionable with their lowermost edges above the sump tray so that liquid impinging on the plates will be collected in the sump tray.

According to a third aspect of the present invention there is provided a method of protecting a retort comprising a retort wall defining a volume into which products to be treated are receivable, heating means for heating the retort, and coolant spray means for spraying a liquid coolant onto products received in the retort against thermal shock, the method comprising the step of mounting shielding means within the retort to prevent liquid coolant sprayed from the coolant spray means within the retort from impinging on the interior of the retort wall.

According to a first preferred version of the third aspect of the present invention the method includes the steps of:

mounting a sump tray at a lower region of the retort;

providing a drain conduit through the retort wall to drain liquid from the tray; and mounting a plurality of vertically extending shield plates within the retort with the lowermost edges of the plates positioned above the sump tray.

According to a second preferred version of the third aspect the method of the first preferred version wherein the shielding means comprises an impervious layer of thermally insulating material; includes the steps of:

opening the drain valve to empty the trap;

closing the drain valve prior to a cooling operation; and establishing shield failure by sensing liquid coolant in the trap after the cooling operation has started. Typically the step of detecting liquid comprises either detecting a level of the liquid or detecting a constituent of the liquid.

According to a fourth aspect of the present invention there is provided apparatus for locating within a retort a plurality of substantially cylindrical objects having a pair of transverse end walls joined at their edges to a sidewall in paraxial layered relation with objects spaced by at least a minimum predetermined spacing distance from each other, comprising: a substantially planar mat having first and second faces; and a plurality of arrays of projections extending from one of said faces, each array being arranged to receive an end face of one of said objects there-between in a location position; wherein the height of the projections is so arranged that when one end face of an object contacts a free end of a projection, the other end face of the object is offset from its location position.

According to a first preferred version of the fourth aspect of the present invention the height of the projections is so arranged that when one end face of an object contacts a free end of a projection, the other end face of the object is offset from its location position by at least the minimum predetermined spacing distance.

According to a second preferred version of the fourth aspect of the present invention or of the first preferred version thereof each array comprises three or more projections.

According to a third preferred version of the fourth aspect of the present invention or of any preceding preferred version thereof each projection comprises a cylindrical base section and a conical top portion. Typically the diameter of the base section corresponds to said minimum predetermined spacing distance.

A main concern of the present invention is to provide means to improve the service life of a retort wherein cans are successively heated and particularly cooled, by spray-cooling, and wherein agitation of the cans during heating and/or cooling leads to rapid thermal cycling of the retort.

The present invention also seeks to provide a retort apparatus and an operating method for thermal treatment of canned products wherein the service life of the retort is maximised by reducing or eliminating local thermal shock to the retort.

A further concern of the invention is to provide a detection system for detecting impingement of coolant of the interior of the retort.

Another aspect of the invention provides for a layer mat for placing between the layers of cans in the retort to locate the cans and optionally to assist in the control of the flow of coolant.

In the description the term "cylindrical" is not to be construed as limiting to products having a cross-section which is circular but to any substantially symmetrical cross-section.

BRIEF DESCRIPTION OF DRAWINGS

Embodiments of the invention will now be described in detail with reference to the accompanying drawings, in which:

FIG. 2 is a transverse sectional view of the retort of FIG. 1;

FIG. 3 is a schematic partial side view of a layer mat, showing positional of cans; and FIG. 4 is a diagrammatic view of cans as loaded into a retort.

MODES FOR CARRYING OUT THE INVENTION

Figure 1:
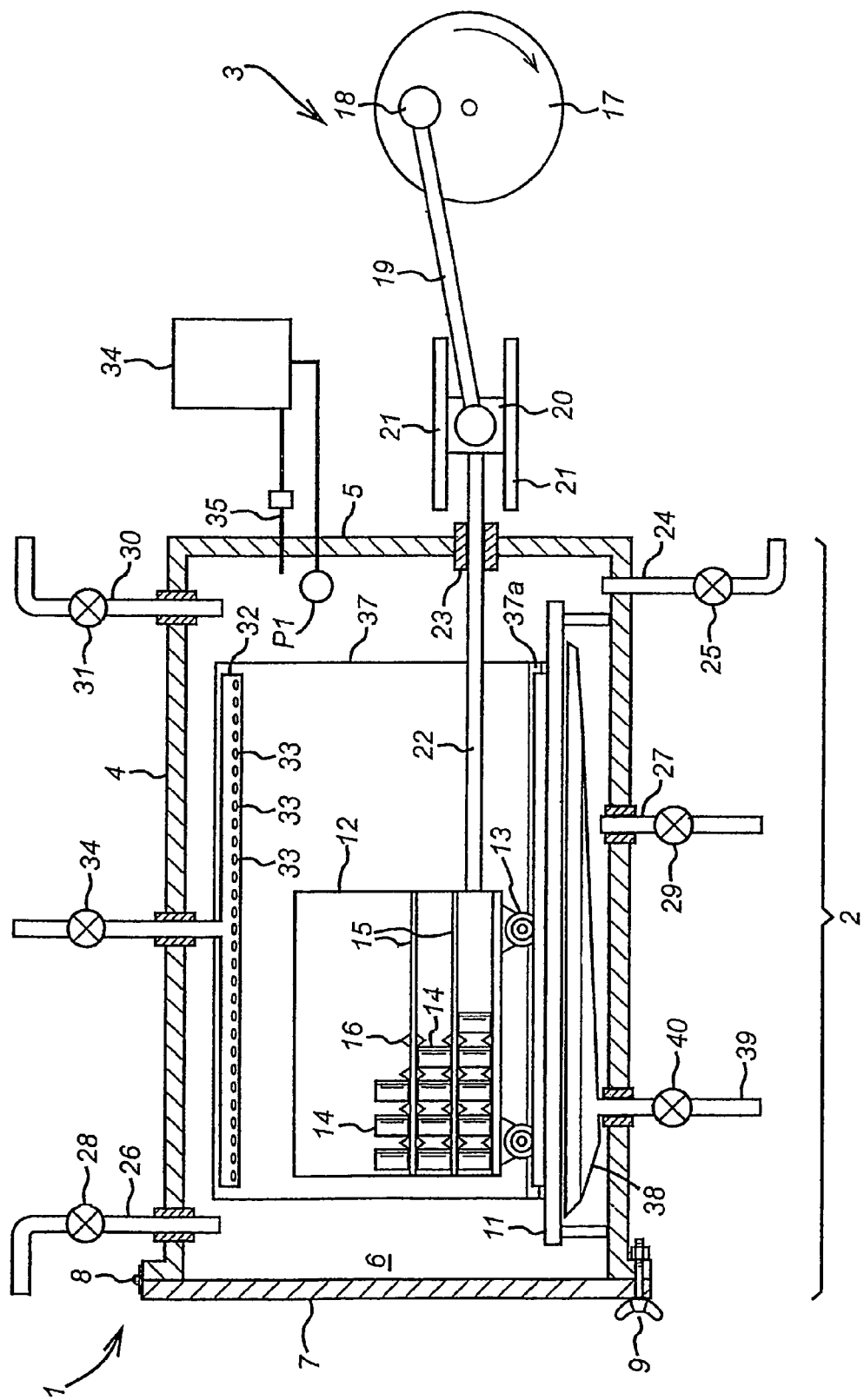
FIG. 1 is a schematic sectional side view of a retort in operation to heat a plurality of cans.

Referring now to FIGS. 1 and 2, there is shown a retort installation comprising a retort 2 and an agitator drive assembly 3.

The retort comprises a cylindrical pressure vessel 4 having a closed end 5 and an open 6 to which is mounted a door 7. The door 7 is supported by a hinge 8, seen at the top of the door in this embodiment, and is held closed by a locking screw 9. The door 7 may be opened by releasing the locking screw 9 and rotating the door clockwise (as seen in FIG. 1). The door 7 may be supported at its side or lower edge instead of the top edge as shown, and may be locked closed by other means than the locking screw 9 shown in FIG. 1. The door may have a domed shape (convex inwardly or outwardly) to better resist internal pressure within the pressure vessel 4.

Extending axially within the pressure vessel 4 are mounted a pair of rails 11, on which a carriage or cage 12 runs on wheels 13. The cage is adapted to contain a plurality of cans 14 in horizontally-extending layers separated from adjacent layers by layer mats 15. The layer mats 15 have vertically-extending locating studs 16 to engage the cans 14, as will be described in more detail later.

The agitator drive assembly 3 comprises a flywheel 17 rotatable by a motor (not show) and carrying a crank pin 18 to which one end of a connecting rod 19 is attached. The other end of the connecting rod 19 is attached to a crosshead 20 which is held between a pair of crosshead guides 21. As will be appreciated, rotation of the flywheel 17 will cause reciprocating linear movement of the crosshead 20 to the left and right as seen in the Figure.

The crosshead 20 is attached to one end of a drive rod 22, which passes through a bearing seal 23 set in the closed end wall 5 of the retort 2. The other end of the drive rod 22 is attached, preferably by a releasable coupling, to the cage 12. The drive rod extends parallel to the rails 11, so that rotational motion of the flywheel is converted into reciprocation movement of the cage 12 along rails 11. The frequency of the reciprocation motion, and thus the acceleration experienced by the cage and its contents, is variable by controlling the speed of the flywheel 17.

The retort is provided with an inlet port 24 for introducing a heating medium such as steam or heated water into the retort 2, and an inlet valve 25 controls the flow of the heating medium through the port 24. A diffuser or spreader (not shown) may be provided to distribute the heating fluid (steam or water) throughout the interior of the retort.

Upper 26 and lower 27 outlet ports are provided in the retort wall, controlled by respective upper and lower outlet valves 28 and 29. A purging inlet port 30 is further provided, controlled by a purging valve 31.

To cool the cans after they have been maintained at high temperature for sufficient time, a coolant spray bar 32 extends along the upper part of the retort 2, with spray nozzles 33 for directing a coolant spray onto the cans 14 in the cage 12. The flow of coolant is controlled by coolant valve 34. Multiple spray bars or other spray nozzle arrangements may be provided, so that a coolant flow is delivered to all the cans in the batch being processed.

The preferred sequence of operation of the retort of FIGS. 1 and 2 will now be described.

Filled and sealed cans are loaded into the cage 12 and are clamped into position within the cage. The cage is then loaded into the retort with its wheels 13 positioned on the rails 11 within the retort 2. The cage is then attached to the drive rod 22, which passes through the closed end 5 of the retort, and the retort door 7 is closed and locked in place.

The drive motor to agitate the cans is then switched on causing the cans and cage to reciprocate back and forth with a motion defined by the speed of rotation of the flywheel 17 and the throw of crank pin 18. The motion is transmitted to the cage via the connecting rod 19, crosshead 20 and drive rod 22.

The actual agitation conditions to be used will depend on such things as the viscosity of the food product and the fill level in the can, but should be of sufficient intensity to produce a maximum acceleration of at least 1 g. Typical conditions could be a flywheel speed of 12 orpm and a stroke of 150 mm, producing a peak acceleration equivalent to 1.4 g.

Once agitation at the correct intensity has started the heating process can commence. In the retort shown this is carried out using steam. For this type of process steam is the preferred method of heating as it has a higher heat transfer coefficient than water. Steam will also easily contact all surfaces of the containers. It is difficult to achieve this level of contact with sprayed or raining water systems.

Steam, or a steam/air mixture, from a pressurised supply (not shown) is introduced into the retort via inlet port 24 by opening inlet valve 25. Upper 28 and lower 29 outlet valves are held open to allow air to escape from within the retort 2, in an operation called venting. When the retort reaches a temperature of approximately 100° C. and quantities of steam are issuing from upper and lower outlet ports 26 and 27, the lower outlet valve 29 is closed and steam is allowed to issue from upper outlet pot 26 for a further predetermined period before the upper valve 28 is also closed. Venting schedules, i.e. the intervals between opening valve 25 and closing valves 28 and 29, are preferably determined experimentally for each retort.

The retort now comes up to the required process temperature with the flow of steam through the inlet valve 25 being controlled by a control circuit 34 responsive to a temperature sensor 35 positioned within the retort 2. Once the required temperature in the retort is reached, the timing of the process starts.

At the end of the predetermined process time, inlet valve 25 closes to stop the flow of steam into the retort 2, and air from purging inlet port 30 is introduced via purging valve 31 to sweep steam from the retort, while maintaining the pressure at the level used during the heating process. This is controlled using pressure sensor P1, with steam being exhausted through the upper and/or lower outlet ports and valves.

When enough steam has been swept from the retort and been replaced with air, cooling can commence by use of sprays of cooling water from nozzles 33 in spray bar 32 fed by water from valve 34. If too much steam is left in the retort when cooling starts the cold water will condense the steam and the pressure in the retort will drop excessively.

As cooling proceeds the pressure in the retort is allowed to fall slowly back to atmospheric. Once the cans are cooled, usually down to about 40° C., the retort is opened and the cans unloaded. Typically the total cycle time is about 15 minutes. It is possible to use the system for containers other than metal cans, though because of their robustness and high thermal conductivity they are the preferred container.

In a retort that uses steam for heating and sprays of cold water for cooling, the major thermally induced stress will occur when the steam contracts cold areas of the retort during the heating phase, and when cold water contracts hot areas of the retort during cooling. Areas of particular concern are where there are welds and changes of section.

It is, therefore, proposed that the retort pressure vessel be protected from large thermal shock loads firstly by shielding it from the cooling water and/or secondly by pre-heating it at the start of the day or at the start of each operational period. Its temperature will only fluctuate by a relatively small amount over the working period.

Coolant Shielding

In the illustrated embodiment of FIGS. 1 and 2, the cooling water sprayed from nozzles 33 is prevented from contacting the hot internal surfaces of the retort so that all areas of the retort are maintained at a high temperature throughout the process cycle (say greater than 100°). Shield plates 37 are arranged to extend longitudinally within the retort outside the path of the cage 12, the lower edges 37a of the shield plates 37 being arranged above a sump tray 38 which extends below the rails 11. The positioning and dimensions of the shield plates 37 are such that water sprayed from the nozzles 33 which bounces from the cage 12 and cans 14 impinges on the shield plates and runs down into the sump tray 38. The sump tray drains through a drain 39 controlled by a drain valve 40, which is closed while the retort is pressurised, preferably after the lower valve 29 in the venting stage, and opened to allow coolant to exit during the cooling phase of the cycle. Until the pressure within the retort has been sufficiently reduced, opening of the valve 40 will be controlled so as not to allow sudden depressurisation but to permit a sufficient rage of egress of coolant to prevent overflowing of the sump tray 38. One or more level sensors may be provided in the sump tray, linked to the control circuitry for the drain valve 40, to increase opening of the drain valve 40 as the level of liquid in sump tray 38 rises.

The shield plates 37 may be mounted to the interior of the retort wall, preferably on thermally insulated mountings 41, as shown at the right-hand side in FIG. 2. Alternatively, the shield plates 37 may be in-turned, as seen in FIG. 2, to ensure that water flowing from the plates 37 will fall into the sump tray 38. When the plates 37 are mounted on the cage (or cages) 12, then the sump tray must be dimensioned so that water flowing or dripping from the plates 37 falls into the tray 38 irrespective of the reciprocating motion of the cage 12 and plates 37.

The shield plates 37 may be of solid metal or plastics sheet material, or may be formed from foam or mesh materials, provided that they are of a pore or mesh size effective to prevent droplets or streams of coolant from impinging on the retort wall. A mesh having openings of 1 mm or less, preferably 0.5 mm or less, and most preferably 0.25 mm or less, in diameter is effective as a shield against rebounding droplets.

In an alternative arrangement, the shielding may be effected by applying an impervious layer of thermally insulating material to the interior of the retort wall, to prevent contract between the coolant and the wall.

It is also preferred to thermally isolate the pipes bringing in and carrying away cooling water from the body of the retort, by surrounding the pipes with thermal insulation at their points of passage through the retort wall. There is a risk that during the cooling phase of the process cycle the shields provided to keep the cooling water from contacting the hot walls of the retort are not totally effective, and may allow cold water to flow onto the interior of the retort walls, cooling them locally at the point of contact. The present invention provides for monitoring means to detect failures of the shielding, as seen in detail in FIG. 3. The monitoring means comprises, in the illustrated embodiment, a trap 43 formed by a tube 44 closed at its lower end 44a and fixed into the lowermost part of the wall 4 of the retort 2 to form a downwardly-extending trap, open to the interior of the retort. The retort 2 is arranged so that any coolant spray which strikes the interior of the retort will run down into the trap 43. The trap 43 is provided with a coolant sensor 45, which may be a level sensor or a capacitive sensor, to detect coolant collected in the trap. The coolant sensor 45 may provide detection signals to the control circuit 34, or may be an independent unit providing audible or visual detection signals by a sounding or display device. The trap 43 has a drain valve 46 for emptying the trap prior to use, which may be controlled manually or by the control circuit 34.

Before each cooling cycle, the drain valve 46 is opened to clear the trap 43 of any condensate, and is then re-closed. If any coolant runs into the trap during the cooling cycle, then it is detected by the coolant sensor 45 and a detection signal is output, alerting the operator to a shield failure. A typical sequence of operation may be as follow:

At the start of the cycle, i.e. with the retort 2 open ready to be loaded with cans, the drain valve 46 on the trap 43 is opened to ensure the trap is empty. If it is not, the control circuit 34 will cause a warning to be given, and the process cycle will not be allowed to commence.

Once the retort 2 is loaded, the door 7 closed and the steam supply turned on by opening the inlet valve 25 to start the heating process, the drain valve 46 on the trap 43 closes. As the heating process proceeds condensate will run down the wall 4 of the retort and start to fill the trap 43, and the rise in the level of liquid in tube 44 will be detected by the sensor 45 and monitored by the control circuit 34. The signals from sensor 45 may be compared with signals from previous heating cycles by the control circuit 34, to ensure the readings are typical. This can not only check that the level sensor is working, but may also serve to indicate that nothing untoward is happening during the heating phase if the sensor signals substantially correspond to those of earlier process cycles. If different results are obtained, e.g. if larger amounts of condensation from the steam supply are detected, this may indicate unusual heat losses from the retort that could prejudice the process, or may indicate excessive amounts of liquid water in the steam.

At the end of the heating stage of the process cycle air is introduced through purging valve 31 to sweep the steam from the retort and replace it with air before cooling can begin. During this phase the drain valve 46 on the trap 43 is opened and the condensate drained away until the sensor 45 detects the trap to be empty, whereupon the drain valve 46 is closed.

The cooling phase now begins. During normal operation no coolant will drain into the trap 43 and the sensor 45 will confirm this to be the case. If, however, the coolant is not all caught by the shields 37 and sump tray 38, the trap 43 will start to fill and the coolant in trap 43 will be detected by the sensor 45. The control circuit 34 will then alert the operator to this abnormal situation, and may be programmed to allow the cooling phase to be completed but not allow the next cycle to commence without authorised intervention.

As an alternative to detecting the level of liquid coolant in trap 43, the coolant may have an additive such as a dye or chemical tracer which may be detected visually through a window in tube 44, or the sensor may be arranged to detect the tracer chemically by analysis of the trap contents. For example, the coolant may include an additive which makes the pH of the coolant different from the usual condensate, and may be detected by testing the pH of the trap contents with litmus. Condensate from the heating process will not contain the additive, and thus presence of the additive in trap 43 will indicate shield failure without necessarily having to drain the trap before each cooling cycle.

In a preferred embodiment, the functions of the trap 43 and the lower outlet 27 may be combined, by providing a coolant sensor 45 at the outlet 27 upstream of the lower outlet valve 29. Downstream of the lower outlet valve, a diverter arrangement will be provided to vent steam from the lower outlet valve to atmosphere, and to direct coolant either to a suitable drain, or to a refrigeration or heat exchanger circuit for cooling and recycling.

In a water spray heating and cooling retort, the cans in the retort are heated not by filling the retort with steam, but by spraying the cans with hot water. Cooling is effected by spraying with cold water as described above. By providing the shielding described above both for the hot and the cold water, the retort walls are at all stages isolated from contact with the hot and cold liquids, greatly reducing the thermal cycling of the retort and extending its life. The shield failure sensor described above will be effective to detect hot as well as cold water impinging in the retort wall.

Pre-Heating

The retort may additionally or alternatively be operated using a regime which minimises the thermal shock to the retort at the start of the process cycle. This is particularly suitable to retorts heated by steam or steam/air mixtures, and is achieved by slowly pre-heating the retort prior to charging the retort with cages of cans. An example of such an operating regime would be as follows:

With the retort empty of cans and cages the door is closed and the preheating step commences, in which the temperature of the retort is raised slowly to 100° C. over a time that is dependent on the initial temperature of the structure of the retort by partially opening the inlet valve 25 to admit a limited flow of steam. The colder the retort, the longer is the pre-heating time, preferably up to a maximum of about 5 minutes. The exact time required to preheat any particular retort from an initial temperature to its operating temperature will preferably be determined by experiment. As the initial temperature of the retort may not be known precisely, it may be estimated from the length of time since the end of the last process cycle together with a knowledge of the cooling rate of the structure. From this estimate the required length of pre-heat can be determined.

When the retort reaches 100° C. the steam supply is then turned fully on (inlet valve 25 fully open) to correctly vent the retort for, say, ten seconds before the lower outlet port 27 is closed followed by a further ten seconds, say, before the upper outlet port 26 is closed. The steam supply is immediately reduced, by partially closing the inlet valve 25, to a level such that it will take the retort a further two minutes or so to reach process temperature and pressure. (For a given installation the required interval us conveniently determined by experiment).

The process timer is now started and the process continues for as long as experiments have determined to be necessary to raise the fabric of the retort substantially to its working temperature.

The steam supply (inlet vale 25) is then turned off and the upper outlet port 26 opened slowly to allow the steam to escape from the retort and reduce the pressure to zero. The pre-heated retort is ready for loading with one or more cages for cans for production.

The slow pre-heating of the retort is done to avoid thermal shocks during this operation and as the retort is hot when production commences, thermal shock loads are significantly reduced. Control of the valves 25, 28, 29, 31, 34 and 40 is preferably affected by the control circuit 34, which may be a process controller, a programmable microprocessor or a personal computer or the like.

To ensure that the retort is always at a sufficiently high temperature to avoid these shock loads the time from the end of the previous process is measured. If it is too long the control circuitry 34 controlling the whole operation of the retort is preferably arranged so as not allow the next process cycle to commence until the retort is again pre-heated. The exact length of the pre-heating required varies, depending on the time that has lapsed since the end of the last process and other factors such as ambient temperature. The actual length of the pre-heat required is determined by experiment, and preheating times for various intervals since last use may be stored in memory accessible to the control circuit 34.

The control circuit 34 may be arranged to cause an audible or visual warning to be given before the end of the time interval after a heating cycle in which a further heating cycle may be started without pre-heating the retort, so that the operator can decide whether there is time to load the retort and start the next process or whether he needs to carry out a pre-heat cycle.

Can Loading and Positioning.

To achieve consistent process results, each container or can 14 must be held securely and in its correct position with respect to its neighbours.

A method and apparatus for stacking cans 14 into their cages 12 is now described with reference to FIG. 4, and is applicable to hand loaded, semi-automatic or fully automated processing installations.

The cage 12 is loaded with cans 14 by placing a layer mat 15 in a horizontal position in the cage, with its studs 16 extending upwardly. There is provided for each can in a layer, an array of studs arranged around the perimeter of a circle whose diameter corresponds to that of a can 14, at preferably equiangular but possibly irregular spacing. Most preferably four studs are provided for each can, but in alternative embodiments three or fewer, or five or more, studs may be used. For cans of non-circular section, an array of studs arranged to suit the cross-section of the can is provided.

The uppermost and lowermost layer mats 15 are preferably provided with studs on one face only, while intermediate layer mats, intended to be positioned between two layers of cans 16, have studs on both faces.

In the example shown each can 14 is located within the cage 12 by eight cone shaped studs 16, four studs being attached to each of two layer mats 15 to locate respective ends of the can 14. The studs 16 have a cylindrical base section 16a and a conical tapered top section 16b ending in a rounded tip 16c. The spacing of the studs is arranged to receive a particular can closely between each set of four studs. The minimum separation distance S between adjacent cans 14 in a layer is, in the embodiment shown, equal to the diameter of the base section 16a of a stud 16, since the studs are arranged in ranks and files aligned with the ranks and file, of cans in a layer. Alternative arrangements where studs are positioned so that each stud contacts three or four, rather than two, cans 14 are possible, using staggered rows of cans in each layer. The size and shape of the studs 16 is such that during the operation of loading cans into the cage, the conical top sections 16b act as lead-in surfaces, and the cans are positioned accurately by contracting the base sections 16a of the studs 16. The cans 14 are loaded by placing the end of the can between the studs 16. If the end edge of the can contacts the conical top section 16b of a stud, the can will be guided to its correct position. If a can is placed with the rounded tip 16c of a stud contacting the end of the can, as seen in chain lines in FIG. 4, then the can will preferably be sufficiently misaligned as to interfere with at least on of its neighbours, and miss-loading will be apparent to an operator. If this situation is not corrected it may also prevent the correct positioning of the next lay mat 15, making miss-loading apparent. The present system is, however, tolerant of missing cans. Indeed this is a significant feature as it is almost certain to happen in practice. During loading the cans are arranged with their axes vertical and with the layer mats 15 horizontal. For loading into the retort 2, the cage 12 may be laid on its side so that, in contrast to the example shown, the axes of the cans 14 are horizontal and parallel to the cylindrical axis of the retort, i.e. the axes of the cans extend in the direction of their reciprocating movement during agitation.

The cans 14 are preferably arranged in "sticks" of axially aligned cans, with a gap between each two adjacent cans in the stick formed by the layer mat. The layer mat may have an embossment or step on which each stud 16 sits. In the preferred arrangement, the "sticks" of cans extends horizontally in the retort, in the agitation direction. A clearance of about 10 mm, or possibly more, is provided between each stick of cans and its neighbour in the horizontal direction sufficient to allow free flow of heating and cooling fluids. In the vertical direction each stick is preferably positioned directly over the one beneath with a clearance space of about 3 mm, or more, between sticks. Such an arrangement gives good flows of both steam and water over the cans, though other arrangements may be satisfactory.

It should be noted with respect to the loading and location of the cans that cans may be cylindrical, so that the outside diameter of the two ends of the can are substantially equal, or the diameters of the ends of the can may differ by an amount of 2 mm or more.

To locate cylindrical cans, or cans whose end diameters differ by about 2 mm or less, the same layout and spacing of studs is preferably used for both ends of each can. Most preferably, studs on opposite faces of the layer mat will be coaxial, with the stud layout adopted being that for the larger of the two diameters if different. If the difference in diameter is greater than about 2 mm, the spacing and/or layout of the studs may be varied as appropriate for each can end. Necessitating that the cans be loaded in a predetermined orientation. If this is not done correctly it will be clear to the loader either at this stage or when the next layer mat is positioned.

The cage may be loaded either by hand or by using a semi or fully automated system. The description below is for an entirely hand loaded operation.

First the cage 12 is positioned with an open side upward, and a bottom layer mat 15 is placed in position to form a base, with the studs 16 projecting upwards.

The first layer of cans 14 are then loaded by standing each can 14 on the layer mat 15 with the end of the can positioned by an array of studs 16 on the layer mat, each stud engaging the edge of the can. When a first layer is completed, an intermediate type layer mat, having both upwardly extending and downwardly extending studs 16, is lowered vertically through the open side of the cage 12 to rest in a horizontal plane on the tops of the cans of the first layer. The layer mat may guided in the horizontal plane by the corners of the cage 12 so that the downwardly extending studs 16 easily engage the edges of the cans, ensuring secure location of each can.

The second layer of cans is then loaded in a manner similar to the first and another intermediate type layer mat lowered into position. The procedure is repeated until the cage is full when the top layer mat, 5, being of the same type as the bottom mat 3 but with its studs extending downwards, is added. A releasable clamping arrangement can then be used to secure the layers of cans and their interposed layer mates 15 in position in the cage 12.

The loaded cage 12 is then positioned in the correct orientation on a trolley ready to be loaded into the retort. The cage is preferably loaded into the retort with the layer mats in vertical planes, holding the cans 14 with their axes horizontal and aligned with the reciprocation movement direction of the cage, when the cans have an axial length equal to or greater than their diameter (or a representative transverse dimension or "width", in the case where the cans are of non-circular cross-section). However, if the cans are of a squat shape where the axial height is less than their diameter of "width", a more effective orientation may be to keep the cans with their axes vertical or substantially vertical.

For non-circular section containers, similar considerations apply though if the containers are squat in height and rectangular in cross-section they are preferably oriented with the reciprocation direction aligned with the longest transverse dimension.

It should also be noted that for squat containers, whether reciprocated in a direction parallel to their ends or at right angles to them, layer mats 15 with studs 16 on just one side may be used not only at the top and bottom, but also as intermediate layer mates for locating the containers.

The method of hand loading described is necessarily limited to cages of a depth sufficiently shallow that the bottom layer can be reached. For deeper cages a semiautomatic system needs to be employed. For example, the cage may be placed on a suitable frame over a jacking arrangement that lifts up the bottom layer mat to a position near the open top of the cage, allowing for easy loading of the cans. Once the first layer of cans is loaded, the jack is operated to lower this layer of cans by an amount equivalent to the height of the layer. An intermediate layer mat is then added followed by the next layer of cans. The procedure is repeated until the bottom layer mat is positioned at the bottom of the cage, whereupon the top layer mat is placed over the uppermost layer of cans. A clamp may then be used to lock the cans and mats in place.

Such cage loading arrangements using jacking mechanisms of this type are conventional in the canning industry, and can be used to load any size of cage.

A fully automatic version could be envisaged using similar principles, but instead of hand loading the cans into each layer an automated "pick and place" unit would be used.

INDUSTRIAL APPLICABILITY

The invention is applicable throughout the canning industry which is an industry of major importance in a large number of countries. Apart from providing for more rapid sterilisation of a given load of filled cans (and so a greater throughput in a given time period) it reduces by a substantial amount the heat required in the step and so the fuel cost.

The invention claimed is:

1. An apparatus for heat-treating products, the apparatus comprising:
    a retort into which one or more products to be treated are receivable;
    a heating means for heating the retort;
    a coolant spray means for spraying a liquid coolant onto the one or more products received in the retort;
    a shielding means to substantially prevent the liquid coolant sprayed from the coolant spray means from impinging on an interior of the retort;
    a sump tray mounted at a lower region of the retort having a drain conduit extending through a retort wall to drain the liquid coolant from the sump tray; and
    a plurality of vertically extending plates positioned with their lowermost edges above the sumo tray such that the liquid coolant impinging on the plates will be collected in the sump tray.

2. The apparatus as claimed in claim 1, wherein the shielding means comprises one or more plates of one of a solid metal and a plastic sheet material.

3. The apparatus as claimed in claim 1, wherein the shielding means comprises one of a foam and a mesh material having one of a pore and a mesh size effective to prevent one of droplets and streams of the liquid coolant from impinging on a retort wall.

4. The apparatus as claimed in claim 1, wherein the retort incorporates a carrier for supporting the products within the retort and movable relative to the retort, and at least one plate of the shielding means is mounted on the carrier.

5. The apparatus as claimed in claim 1, wherein the retort is provided with a trap means at a lower part of the retort, adapted to catch the liquid coolant impinging on a retort wall due to failure of the shielding means, and a selectively openable drain valve in communication with the trap and openable to drain the liquid coolant from the trap.

6. The apparatus as claimed in claim 5, wherein the trap means incorporates a sensor for detecting the presence of the liquid coolant in the trap means, the sensor being one of a level sensor and a sensor adapted to detect a constituent of a liquid coolant composition.

7. A shielding apparatus for a retort, the apparatus comprising:
   a retort wall defining a volume into which products to be treated are receivable;
   a heating means for heating the retort;
   a coolant spray means for spraying a liquid coolant onto the products received in the retort;
   a shielding means mountable within the retort to substantially prevent the liquid coolant sprayed from the coolant spray means from impinging on an interior of a retort wall;
   a sump tray mounted at a lower region of the retort having a drain conduit extending through a retort wall to drain the liquid coolant from the sump tray; and
   a plurality of vertically extending plates positioned with their lowermost edges above the sump tray such that the liquid coolant impinging on the plates will be collected in the sump tray.

8. The shielding apparatus as claimed in claim 7, wherein the shielding means comprise one of a foam and a mesh material having one of a pore and a mesh size effective to prevent one of droplets and streams of the liquid coolant from impinging on the retort wall.

9. The shielding apparatus as claimed in claim 7, wherein the shielding means includes a sump tray mounted at a lower region of the retort and having a drain conduit extendable through the retort wall to drain liquid coolant from the sump tray, and a plurality of vertically extending plates positionable with their lowermost edges above the sump tray so that liquid coolant impinging on the plates will be collected in the sump tray.

10. A method of protecting a retort comprising a retort wall defining a volume into which products to be treated are receivable, a heating means for heating the retort, and a coolant spray means for spraying a liquid coolant onto the products received in the retort against thermal shock, the method comprising the step of:
   mounting a shielding means within the retort to prevent the liquid coolant sprayed from the coolant spray means within the retort from impinging on an interior of a retort wall;
   mounting a sump tray at a lower region of the retort;
   providing a drain conduit through the retort wall to drain the liquid coolant from the tray; and
   mounting a plurality of vertically extending shield plates within the retort with lowermost edges of the plates being positioned above the sumo tray,
   establishing shield failure by sensing the liquid coolant in the trap after the cooling operation has started.

11. The method of protecting a retort as claimed in claim 10 further comprising the step of detecting the liquid coolant in the trap by one of detecting a level of the liquid coolant therein and detecting a constituent of liquid coolant therein.

* * * * *